United States Patent [19]

Vassilakis et al.

[11] Patent Number: 5,208,197

[45] Date of Patent: May 4, 1993

[54] OCTANE GASOLINE CATALYST

[75] Inventors: James G. Vassilakis, Westmont, Ill.; Donald F. Best, Mahopac, N.Y.; Gary W. Skeels, Brewster, N.Y.; Edith M. Flanigen, White Plains, all of N.Y.

[73] Assignee: UOP, Des Plaines, Ill.

[21] Appl. No.: 885,707

[22] Filed: May 19, 1992

Related U.S. Application Data

[60] Division of Ser. No. 694,198, May 1, 1991, Pat. No. 5,160,033, which is a continuation-in-part of Ser. No. 596,157, Oct. 11, 1990, Pat. No. 5,095,169, Continuation-in-part of Ser. No. 366,263, Jun. 12, 1989, abandoned, Division of Ser. No. 175,332, Mar. 30, 1988, abandoned, which is a continuation-in-part of Ser. No. 417,611, Oct. 5, 1989, Pat. No. 5,013,699, which is a continuation-in-part of Ser. No. 178,901, Apr. 7, 1988, abandoned, which is a continuation-in-part of Ser. No. 541,580, Jun. 21, 1990, Pat. No. 5,116,794, Continuation-in-part of Ser. No. 366,264, Jun. 12, 1989, abandoned, Continuation of Ser. No. 175,333, Mar. 30, 1988, abandoned.

[51] Int. Cl.$^5$ .............................................. B01J 29/06
[52] U.S. Cl. .................................................... 502/67
[58] Field of Search ........................................ 502/67

[56] References Cited

U.S. PATENT DOCUMENTS

| | | | |
|---|---|---|---|
| 4,486,296 | 12/1984 | Oleck et al. | 502/67 |
| 4,740,292 | 4/1988 | Chen et al. | 208/120 |
| 4,925,546 | 5/1990 | Kukes et al. | 502/67 |
| 5,013,699 | 5/1991 | Vassilakis et al. | 502/73 |
| 5,116,794 | 5/1992 | Skeels et al. | 502/85 |

Primary Examiner—Carl F. Dees
Attorney, Agent, or Firm—Thomas K. McBride; Richard G. Miller

[57] ABSTRACT

The combination of a steam-stabilized form of zeolite Y, known in the art as Y-85, and a form of zeolite beta which has been modified to maximize the weak acid sites and minimize the strong acid sites, is found to be a uniquely effective acidic component of a hydrocracking catalyst for the production of gasoline. Both the catalyst composition and the hydrocracking process utilizing the catalyst are disclosed.

4 Claims, No Drawings

OCTANE GASOLINE CATALYST

RELATED APPLICATIONS

This application is a division of application Ser. No. 694,198, filed May 1, 1991, now U.S. Pat. No. 5,160,033 which is in turn a continuation-in-part of application Ser. No. 596,157, filed Oct. 11, 1990, now U.S. Pat. No. 5,095,169, which is in turn a continuation-in-part of Ser. No. 366,263, filed Jun. 12, 1989, now abandoned, which is in turn a division of Ser. No. 175,332, filed Mar. 30, 1988, now abandoned; and a continuation-in-part of application Ser. No. 417,611, filed Oct. 5, 1989, now U.S. Pat. No. 5,013,699, which is in turn a continuation-in-part of Ser. No. 178,901, filed Apr. 7, 1988, and now abandoned; and a continuation-in-part of application Ser. No. 541,580, filed Jun. 21, 1990, now U.S. Pat. No. 5,116,794 which is in turn a continuation-in-part of Ser. No. 366,264, filed Jun. 12, 1989, now abandoned, which is in turn a continuation of Ser. No. 175,333, filed Mar. 30, 1988, now abandoned.

FIELD OF THE INVENTION

This invention relates in general to catalyst compositions useful in hydrocarbon conversion reactions, and more particularly to such catalyst compositions comprising a metal hydrogenation component and a zeolite component which is a mixture of a particular highly stabilized form a zeolite Y and a particular form of zeolite beta. The invention also relates to the use of such catalyst compositions in processes for hydrocracking hydrocarbon feedstocks.

DESCRIPTION OF THE PRIOR PUBLISHED ART

The use of mixtures of zeolites having different crystal structures or of mixtures of different cation forms of the same zeolite structure in hydrocarbon conversion catalyst compositions is well known in the art. Usually such mixtures are employed to selectively convert different hydrocarbon species within a mixed hydrocarbon feedstock. For example, in U.S. Pat. No. 4,100,108 there are proposed catalyst compositions containing mixtures of faujasite-type zeolites having different sodium ion contents whereby the S and M activity of the overall catalyst can be controlled. In U.S. Pat. No. 3,758,402 catalytic mixtures of large pore zeolites, such as zeolite X or zeolite Y, and smaller pore zeolites, such as ZSM-5 are disclosed for use in hydrocracking processes. Catalyst compositions for use in hydrodewaxing comprising a mixture of a zeolite having a Constraint Index of greater than 1.0 with a zeolite having a Constraint Index of less than 1.0 are proposed in U.S. Pat. No. 4,575,416. In U.S. Pat. No. 4,486,296, the combination of zeolite beta with any zeolite having the faujasite-type of crystal structure is proposed for use in the simultaneous hydrocracking and dewaxing of heavy oils to effect a bulk conversion of the oil while at the same time yielding a low pour point product.

In addition to combining zeolites of different cation contents and pore diameters, it has also been proposed to combine zeolite species having different types of pore channel systems. In U.S. Pat. No. 3,864,283, zeolites having three-dimensional pore systems, such as zeolite Y, are combined with zeolites having two-dimensional pore channels, such as mordenite, zeolite L and zeolite omega, to form catalyst compositions useful in hydrocarbon conversion reactions generally, but particularly in hydroisomerization and hydrocracking.

SUMMARY OF THE INVENTION

It has now been found that the combination of a particular form of zeolite beta with a particular stabilized form of zeolite Y is highly effective in the conversion of hydrocarbon fractions to high octane products boiling in the gasoline range. The catalyst preferably includes a hydrogenation component to catalyze the hydrogenation reactions. The hydrogenation component can be a noble metal or a non-noble metal of the conventional kind, e.g. nickel, cobalt, tungsten, molybdenum or a combination thereof.

The zeolite beta constituent is any three-dimensional microporous aluminosilicate zeolite having the characteristic crystal structure of zeolite beta as elucidated in U.S. Pat. No. 3,308,069, Wadlinger et al, issued Mar. 7, 1967, which has been prepared by ion-exchanging the sodium and hydrogen cation form of the zeolite, in which the hydrogen cations are formed by the thermal decomposition of the organic templating cations, with a hydrogen-forming cation other than hydronium to reduce the sodium cation population to less than 25 equivalent percent, preferably less than 10 equivalent percent, and calcining the thus-exchanged zeolite in air or an inert atmosphere to a temperature effective to form an initial concentration of weak acid species and strong acid species and continuing said heating, preferably at a temperature of 600° C. to 700° C., to substantially reduce the concentration of strong acid species without substantially reducing the concentration of weak acid species.

The stabilized zeolite Y constituent is described in detail in U.S. application Ser. No. 417,611, filed Oct. 5, 1989, now U.S. Pat. No. 5,013,699, the entire content of which is incorporated herein by reference. In general the stabilized zeolite Y is prepared by the process which comprises the steps of:

(a) ammonium ion-exchanging zeolite Y to lower its alkali metal content to less than 4.0 weight percent;

(b) hydrothermally steaming the low-sodium product of step (a) at a temperature of 550° C. to about 850° C. to reduce the unit cell dimension; and (c) contacting the steamed product of step (b) with a sufficient amount of an aqueous solution of ammonium ions having a pH of less than about 4.0 for a sufficient time to exchange at least some of the residual alkali metal cations for ammonium ions and to increase the bulk $Si/Al_2$ molar ratio of the zeolite composition to the range of 6.5 to 20.

The hydrocarbon feedstock is contacted with the catalyst composition under conversion conditions which are appropriate to hydrocracking. In the conversion process, the feedstock aromatics and naphthenes are converted, principally by the zeolite Y-derived constituent, in accordance with a number of mechanisms, including dealkylation, decyclization and cracking, followed by hydrogenation. The $C_5$–$C_6$ normal paraffin species, either present in the feedstock or produced during the hydrocracking process, are selectively converted by the zeolite beta constituent to octane-improving branch chain paraffins.

DETAILED DESCRIPTION OF THE INVENTION

In copending application Ser. No. 417,611, filed Oct. 5, 1989, there is described and claimed a novel zeolitic catalyst material which, due to its unique activity, selectivity and stability, is found to be highly effective as the acidic constituent of dual function hydrocarbon conversion catalyst compositions. This zeolite composition is denominated and referred to hereinafter as Y-85. Because of the method by which it is produced, this zeolite catalyst can exhibit various degrees of acidity and thus be readily adapted to convert the desired fraction of hydrocarbon feedstock to lower boiling products. At the same time, its selectivity for the degree of fragmentation of feedstock molecules can be adapted to meet the different requirements of, for instance, mid-barrel hydrocracking and gasoline hydrocracking. In gasoline hydrocracking, multiple fragmentation of the feed molecules is required.

In copending application Ser. No. 541,580, filed Jun. 21, 1990, now U.S. Pat. No. 5,116,794 (incorporated by reference herein in its entirety) there is described and claimed a process for modifying as-synthesized forms of zeolite beta which maximizes the weak acid sites, attributable at least in part to hydroxoaluminum cations, $Al(OH)_{3-x}{}^{x+}$, and minimizes the strong acid sites, represented by hydronium cations, $H_3O^+$.

In copending application Ser. No. 596,157, filed Oct. 11, 1990, now U.S. Pat. No. 5,095,169 (incorporated by reference herein in its entirety) there is described the process for catalytically isomerizing low molecular weight normal paraffin hydrocarbons to non-normal, i.e., branch chain paraffins of higher octane number. The catalyst employed in the isomerization reaction is the modified zeolite beta of the aforesaid Ser. No. 541,580.

It is observed that in carrying out a hydrocracking process using the above-mentioned Y-85 material as the acidic constituent of the hydrocracking catalyst, the activity of the catalyst is very high and, as a consequence, a significant reduction in the reaction temperature, both first stage and second stage, is possible compared with a conventional commercially available catalyst utilizing LZY-82 as the acidic constituent. This is true regardless of whether the hydrogenation constituent is a noble metal or a base metal. It further appears, however, that the activity of the zeolite constituent does not strongly favor the isomerization of the n-paraffins, particularly the $C_4$–$C_7$ n-paraffins, to branch chain paraffins, although the conversion of these paraffins to aromatic species doubtless occurs to some extent. In any event the $C_4$–$C_7$ paraffin species are present in the gasoline product in amounts such that if they were converted to isoparaffins, the octane of the gasoline product would be significantly improved.

Although the catalytically active sites of the zeolite beta maximized by the ammonium-exchange and high temperature calcination referred to hereinabove are characterized as weak sites, it should not be inferred that the zeolite beta compositions used in the present invention are less effective in catalyzing hydrocracking reactions than, for example, steam stabilized forms of zeolite Y present in most of the hydrocracking catalysts in present commercial usage. In the present invention, the zeolite beta constituent of the catalyst is more active than the Y-85 constituent when each is tested as the sole acidic constituent in a hydrocracking catalyst. It is, moreover, more catalytically active in hydrocracking than any conventional forms of zeolite beta tested. Thus, it appears likely that the enhanced octane number of the hydrocracked product of this invention is due to contribution from each zeolitic constituent and is much more complex a situation than simply the increased isomerization activity of the beta constituent.

The metal hydrogenation catalyst constituent of the present compositions can exist within the final catalyst composite as a compound such as an oxide, sulfide, halide and the like, or in the elemental metallic state. As used herein, the term "metal hydrogenation catalyst" is inclusive of these various compound forms of the metals. The catalytically active metal can be contained within the inner adsorption region, i.e., pore system, of the zeolite constituent, on the outer surface of the zeolite crystals or attached to or carried by a binder, diluent or other constituent, if such is employed. The metal can be imparted to the overall composition by any method which will result in the attainment of a highly dispersed state. Among the suitable methods are (1) impregnation using an aqueous solution of a suitable metal compound followed by drying and thermal or chemical decomposition of the metal compound, (2) adsorption of a decomposable compound of the metal followed by thermal or chemical decomposition of the metal compound, (3) cation exchange using an aqueous solution of a suitable metal salt followed by chemical reduction of the cation, (4) cation exchange using an aqueous solution of a suitable metal compound in which the metal is in the cationic state with coordination complexing agents followed by thermal or chemical decomposition of the cationic complex, and (5) intensive mixing of suitable compounds of the metals such as oxides or salts, as by mulling, with constituents of the final catalyst composition not adversely affected by such mechanical abuse. Methods (3) and (4) are different in that method (3) concerns the use of metal salts, such as chlorides and nitrates of the iron group metals wherein the metal itself is the cation. Method (4) concerns the use of compounds of metals, such as platinum and palladium group metals, in which the metal is contained in the cationic portion of the compound in coordination complex form.

Methods (1), (2) and (3) are conveniently employed to introduce metals such as copper, silver, gold, iron, cobalt and nickel, while methods (1), (2) and (4) are suitable for introducing platinum and palladium group metals. Method (2) is particularly useful for introducing metals such as titanium, chromium, molybdenum, tungsten, rhenium, manganese, zinc and vanadium. Method (5) is particularly useful in combining salts of base metals with binder constituents of the catalysts such as amorphous alumina or silica. While essentially all of the metals possess some activity as hydrogenation promoters and many exhibit other activity in some aspect of hydrocarbon conversion, the preferred hydrogenation metal catalysts are the noble metals of Group VIII, e.g., platinum, palladium and rhodium, the non-noble metals of Group VIII, e.g., cobalt and nickel, and the base metals of Group VIB, e.g., tungsten and molybdenum. The quantity of hydrogenation metals incorporated into the overall catalyst composition is not critical but is usually in the range of 0.3 to about 1.0 weight percent for the noble metals of Group VIII, and in the range of 5 to 35 weight percent for the base metals, as oxides. It is commonly the case that mixtures of metals, particularly of base metals, are employed. The combination of nickel with tungsten appears to be particularly effective as a hydrogenation catalyst. Also the combination of nickel with molybdenum, while less effective than the Ni-W combination, is found to be more effective in conjunction with the particular zeolite constituent of the present invention than with prior-known zeolite Y-based compositions. Although we do not want to be bound by any particular theory, it is believed the decreased levels of octahedral aluminum remaining in the present compositions relative to the prior known zeolite Y-based compositions contribute, at least in part, to this improved property. In the common instance in which a Group VIII non-noble metal and a Group VIB metal component are used in combination, the finished catalyst contains between about 5 and 35%, preferably between about 10 and 30% by weight, calculated as the respective trioxides of the Group VIB metal components, and between about 2 and 15% by weight, preferably between 3 and 10% by weight, calculated as the respective monoxides of Group VIII metal components.

The finished catalyst compositions can contain the usual binder constituents in amounts which are in the range of about 10 to 95 percent by weight, preferably 15 to 50 weight percent. The binder is ordinarily an inorganic oxide or a mixture of two or more such oxides. Both amorphous and crystalline can be employed. Examples of suitable binders are silica, alumina, silica-alumina, clays, zirconia, silica-zirconia and silica-boria. Alumina is a preferred binder material.

The hydrocracking process operating conditions using the catalysts of this invention are, in general, conventional in the art. Such feedstocks as heavy petroleum residual stocks, cyclic stocks, gas oils and heavy gas oils can be hydrocracked at temperatures in the range of 400° F. to 825° F. using molar ratios of hydrogen to hydrocarbon in the range of 2 to 80, pressures between 10 and 3500 psig and a liquid hourly space velocity (LHSV) of from 0.1 to 20, preferably 1.0 to 10.

The method for synthesis of the starting zeolite beta is not a critical factor. At least three methods are known in the art, any one of which is suitable. In U.S. Pat. No. 3,308,069 the hydrothermal synthesis employs tetraethylammonium ions as the templating agent. In U.S. Pat. No. 4,642,226 and U.S. Pat. No. 4,554,145, the organic templating ions are derived from a dibenzyldimethylammonium compound and a dibenzyl-1,4-diazabicyclo [2.2.2] octane compound, respectively. The characteristic x-ray diffraction pattern of the starting beta contains the following d-spacings in combination:

TABLE 1 d Values of Reflections in Zeolite Beta 11.40+0.2
7.40+0.2
6.70+0.2
4.25+0.1
3.97+0.1
3.00+0.1
2.20+0.1

As indicated hereinabove, zeolite beta is ion-exchanged following calcination to remove the organic template by contacting said zeolite beta with a salt solution of at least one hydrogen-forming cation, such as $NH_4^+$ or a quaternary ammonium cation small enough to enter the pore system of the zeolite. The cations present as a result of ion-exchange are preferably present in an amount between about 0.1 wt. % and about 20 wt. % based on the weight of the starting zeolite beta and are typically present in an amount between about 0.5 wt. % and about 10 wt. %.

The ion-exchange is generally carried out by first forming a slurry of the zeolite beta in about 5 to 15 volumes of water per volume of zeolite, and thereafter adding an aqueous solution of the selected cation. The ion-exchange is generally carried out at a temperature of about 50° C. over the period of about 0.5 to 3 hours. The zeolite is then removed by filtration and water washed to remove excess anion present.

For purposes of the present invention, the zeolite beta catalyst must be activated by heating in air or an inert atmosphere, such as nitrogen or an inert gas element, at an initial temperature effective to form an initial concentration of weak acid species and strong acid species and continuing said heating at an activation temperature effective to substantially reduce the concentration of strong acid species without substantially reducing the concentration of weak acid species, both the weak acid and strong acid species being present in the catalyst prior to the activation. Representative of the strong acid species are hydronium cations, i.e., $H_3O^+$, and representative of the weak acid species are hydroxoaluminum cations, i.e., $Al(OH)_{3-x}{}^{x+}$. It is not critical to the present invention how the concentration of the respective acid species is determined. One suitable procedure is set forth in the following reference D. W. Breck and G. W. Skeels, *ZEOLITE CHEMISTRY I, THE ROLE OF ALUMINUM IN THE THERMAL TREATMENT OF AMMONIUM EXCHANGED ZEOLITE Y*, Proceedings of the Sixth International Congress on Catalysis, Vol. 2, pp. 645-659, The Chemical Society, London (1977). This procedure generally involves treating the zeolite sample in a sodium chloride solution and then titrating the sample with sodium hydroxide to obtain two end points, one at a low pH, i.e., the strong acid, and one at a high pH, i.e., the weak acid. A result in terms of milliequivalents of sodium hydroxide per gram of zeolite can then be obtained for each acid species and translated to acid concentration.

Preferably, the activation temperature is effective to reduce the concentration of hydronium cations after activation to a level corresponding to less than 0.2 milliequivalents of NaOH per gram of zeolite beta. Even more preferably, the activation temperature is effective to substantially eliminate the hydronium cations. It is further preferred that the concentration of hydroxoaluminum cations after activation corresponds to a level of at least 0.8 milliequivalents of NaOH per gram of zeolite beta.

Many of the references hereinbefore cited disclose that the zeolite beta catalyst should be activated at a temperature of about 540° C. In accordance with the present invention, the activation temperature must be effective to reduce the concentration of strong acid species well below that obtained with calcination temperatures of about 540° C., and preferably by at least 50% as compared to the concentration of strong acid species remaining after activating at 540° C. Also, it is preferred in accordance with the present invention that the activation temperature be effective to increase the concentration of weak acid species as compared to the concentration of weak acid species remaining after activating at 540° C. More preferably, the concentration of weak acid species is increased by at least 20%. In general, the activation temperatures that correspond to the range wherein the concentration of strong acid sites can be substantially reduced without substantially reducing the concentration of weak acid sites is at least about 600° C. and less than about 700° C. Preferably, the activation temperature is from about 625°-675° C.

The activation time period is not narrowly critical and typically is in excess of 0.25 hours, preferably in excess of 0.50 hours, provided that the activation period is not sufficient to destroy the crystallinity of zeolite beta. Activation of zeolite beta catalyst for a period of about 1 hour or longer is a preferred aspect of this invention.

Although zeolite beta can be synthesized to have a $Si/Al_2$ ratio over a rather wide range, i.e. 10 to 200 according to U.S. Pat. No. 3,308,069, the modified forms of zeolite beta utilized in this invention appear to perform in a superior manner if the $Si/Al_2$ ratio is less than 25. A noticeable decrease in catalytic activity has been observed in hydrocracking for zeolite beta having only a slightly higher $Si/Al_2$ ratio of about 29.

In preparing the modified zeolite Y component of the present catalysts the starting material is a form of zeolite Y which has been ion-exchanged with ammonium ions, or ammonium ion precursors such as quarternary ammonium or other nitrogen-containing organic cations, to reduce the alkali metal content to less than about 4.0 weight percent (anhydrous basis) and preferably to less than about 3.0 weight percent Optionally the starting zeolite Y can also contain, or at some stage of the modification procedure be ion-exchanged to contain, rare earth cations to the degree that the rare earth content as $RE_2O_3$ constitutes from 0.1 to 12.5 weight percent of the zeolite (anhydrous basis), preferably 8.5 to 12 weight percent. It will be understood by those skilled in the art that the ion-exchange capacity of the zeolite for introducing rare earth cations decreases during the course of the overall treatment process of the present invention. Accordingly, if rare earth cation exchange is carried out, for example, as the final step of the preparative process, it may not be possible to introduce even the preferred amount of rare earth cations. The framework $Si/Al_2$ ratio of the starting zeolite Y can be within the range of <3 to 6, but is advantageously greater than 4.8. The manner of carrying out this first ammonium ion exchange is not a critical factor and can be accomplished by means well known in the art. In general such conventional ammonium ion exchanges are carried out at pH values well above 4.0. It has been found to be advantageous to use a three-stage procedure with a 15 weight percent aqueous ammonium nitrate solution in proportions such that in each stage the initial weight ratio of ammonium salt to zeolite is about 1.0. Contact time between the zeolite and the exchange medium is about one hour for each stage and the temperature is about 85° C. The zeolite is washed between stages with about 7.5 liters of water per 0.45 kg. of zeolite. The exchanged zeolite is subsequently dried at 100° C. to a loss on ignition (LOI) at 1000° C. of 18.25 weight percent. If rare earth cations are to be introduced, it is preferred to contact the already ammonium-exchanged form of the zeolite with an aqueous solution of rare earth salts in the known manner. A mixed rare earth chloride salt can be added to an aqueous slurry of the ammonium-exchanged zeolite Y (0.386 grams $RECl_3$ per gram of zeolite) at 85°–95° C. to yield a zeolite product having a rare earth content generally in the range of 8.5 to 12.0 weight percent rare earth as $RE_2O_3$.

The steaming of the ammonium-, and optionally rare earth-, exchanged zeolite Y is accomplished by contact with a steam environment containing at least about 2 psia steam, and preferably 100% steam at a temperature of from about 550° C. to 850° C., preferably 600° C. to 750° C., for a period of time to reduce the unit cell dimension to less than 24.60 Angstroms, preferably to the range of 24.34 to 24.58 Angstroms. We have found the use of 100% steam at a temperature of about 600° to 725° C. for about 1 hour to be an especially useful procedure.

The second, or low pH, ammonium ion exchange is a critical aspect of preparing the modified zeolite Y constituent of the present catalysts. This exchange can be carried out in the same manner as in the case of the initial ammonium exchange except that the pH of the exchange medium is lowered to below 4.0, preferably to below about 3, at least during some portion of the ion-exchange procedure. The lowering of the pH is readily accomplished by the addition of an appropriate mineral or organic acid to the ammonium ion solution. Nitric acid is found to be especially suitable for this purpose. Acids which form insoluble aluminum salts should be avoided to obtain the best results. In performing the low pH ammonium ion exchange, both the pH of the exchange medium, the quantity of exchange medium relative to the zeolite and the time of contact of the zeolite with the exchange medium are significant factors. It is found that so long as the exchange medium is at a pH below 4.0, sodium cations are exchanged for hydrogen cations in the zeolite and, in addition, at least some aluminum, both framework and non-framework, is extracted. The efficiency of the process is improved, however, by acidifying the ion exchange medium using more acid than is required to lower the pH to just below 4.0. The more acidic the exchange medium is, the greater the tendency to extract framework as well as non-framework aluminum from the zeolite. The extraction procedure is carried out to a degree sufficient to produce a zeolite product having a bulk $Si/Al_2$ ratio of from about 6.5 to 20. The term bulk $Si/Al_2$ ratio as used herein refers to the ratio obtained by conventional chemical analysis which includes all forms of aluminum and silicon normally present. Framework $Si/Al_2$ ratios refer to the ratio of $SiO_2$ to $AlO_2$ tetrahedral units in the crystal lattice of the zeolite.

The proportions of the two types of essential zeolite compositions in the catalyst are not critical since each alone is an effective hydrocracking catalyst and each contributes to the composition of the hydrocracked product. Preferably, however, the modified zeolite beta is the minor constituent with respect to the Y-85 constituent and is more preferably present in an amount of from about 10 weight percent to about 30 weight percent of the total amount of beta and Y-85, on an anhydrous basis, present in the catalyst.

The invention is illustrated by the following examples:

EXAMPLE 1

(a) A zeolite beta sample was prepared by the procedures in which 51.7 grams (anhydrous weight) of sodium aluminate were added to 361.4 grams of 40% tetraethylammonium hydroxide (TEAOH)in a one-liter glass beaker and stirred at room temperature for a period of five minutes. The resulting mixture was heated with stirring to reflux and held for ten minutes boiling rapidly in order to dissolve the sodium aluminate. The resulting solution was clear and golden in color but contained a small amount of undissolved sodium aluminate. The solution was cooled with stirring to about 39° C. Once the sodium aluminate/TEAOH solution had cooled, 945 grams of Ludox LS silica sol were added gradually over the period of 25 minutes. The resulting slurry thickened as the silica sol was added. The gel was mixed on the magnetic stirrer for an additional five minutes after all the silica had been added. The entire gel was transferred to a two-liter reactor equipped with a Parr stirrer top containing a thermocouple. The pH of the transferred gel was 12.1. The reactor was heated to increase the gel temperature from 27° C. to 155° C. over the period of 2 hours, and then held in the range of about 150° C. to 160° C. for 120 hours. Thereafter the reactor and contents were cooled and the reaction solids recovered by filtration, washed with water until the pH of the wash water was 10.35, and dried in air.

(b) About 329 grams of the zeolite beta prepared in part (a) above were calcined in air at 600° C. for 2 hours. The cooled calcination product was ion-exchanged with $NH_4Cl$ using the following procedure: 200 grams of $NH_4Cl$ were dissolved in 3.2 liters of deionized water at about 95° C. The zeolite was added to the $NH_4Cl$ solution and stirred for 1 hour while maintaining the temperature at 95° C. The solids were recovered by filtration and washed with 3.5 liters of warm deionized water. The procedure was repeated two more times. The solids recovered from the third ion-exchange were slurried in 3.2 liters of deionized water and filtered. This washing procedure was repeated three more times, the solids recovered by filtration and dried in air. The chemical composition of the final ion-exchanged zeolite beta was:

| | |
|---|---|
| $Na_2O$, wt. % | <0.03 |
| $(TEA)_2O$, wt. % | — |
| $(NH_4)_2O$, wt. % | 2.48 |
| $Al_2O_3$, wt. % | 6.38 |
| $SiO_2$, wt. % | 92.3 |
| $(TEA)_2O/Al_2O_3$ | — |
| $(NH_4)_2O/Al_2O_3$ | 0.81 |
| $SiO_2/Al_2O_3$ | 24.5 |

EXAMPLE 2

A Y-85 sample, prepared from 500 grams (anhydrous) of a commercially produced steam stabilized form of zeolite Y having a unit cell dimension of 24.520 Å, a $Si/Al_2$ ratio of 5.15 and an $Na_2O$ content of 2.8 weight percent, is slurried in a 15 weight percent aqueous ammonium nitrate solution containing 500 grams of $NH_4NO_3$. The slurry pH is lowered from 4.10 to 2.35 upon addition of 198 grams of 70% aqueous nitric solution. The mixed slurry is heated to 85° C. and its temperature maintained for 60 minutes. The heated slurry is then filtered and the filter cake washed with 8345 ml of distilled $H_2O$. This completes the first stage of ion exchange treatment. The washed filter cake, after drying at 100° C. for 1.5 hours, is slurried again in a 15 weight percent ammonium nitrate solution (500 grams $NH_4NO_3$). The slurry pH is lowered from 4.02 to 2.11 by addition of 70.5 grams of 70% $HNO_3$ aqueous solution. The slurry is heated to 85° C., and after 60 minutes, filtered and washed with 8345 ml. of distilled $H_2O$. The same procedure is followed for the third stage of the ion exchange treatment except the amount of 70% $HNO_3$ is reduced to about 28 grams. The addition of $HNO_3$ lowers the slurry pH from 3.39 to 1.97. The resulting product has a unit cell dimension of 24.488 Å, a $SiO_2/Al_2O_3$ ratio of 9.84, a residual soda content of 0.13 weight percent, and an x-ray crystallinity of 91%.

EXAMPLE 3

A catalyst composition of the present invention was prepared from the calcined and ammonium-exchanged zeolite beta prepared in Example 1, above, and a Y-85 zeolite prepared essentially as in Example 2 above and having the following physical and chemical properties:

Physical Properties

| | |
|---|---|
| Unit Cell Size, Angstroms | 24.505 |
| Crystallinity, % by XRD | 90 |
| 1 Pt. Surface Area, $m^2/g$ | 954 |
| $O_2$ Capacity, g/100 g | 36.63 |
| DTA Crystal Collapse Temp., °C. | 1038 |
| IR Framework, Symmetric | 814 |

Chemical Properties: (anhydrous basis, wt. %)

| | |
|---|---|
| $SiO_2$ | 82.5 |
| $Al_2O_3$ | 13.9 |
| $Na_2O$ | 0.05 |
| $(NH_4)_2O$ | 4.32 |
| Bulk $Si/Al_2$ (molar) Ratio | 10.1 |

In preparing the catalyst, 39.98 grams (anhydrous basis) of a pseudoboehmite alumina phase were peptized using 49.97 grams of a 12% aqueous $HNO_3$ solution and then added to a muller containing 39.98 grams (anhydrous) of the zeolite beta and 119.94 grams (anhydrous) of the Y-85. The resulting mixture was mulled for 10 minutes, 109 grams of distilled water added, and the mulling continued for another 20 minutes. The mulled composition was then extruded into 1/16" pellets and dried at 100° C. for about 20 hours. The dried pellets were calcined at 600° C. in air for 60 minutes and then, after cooling, impregnated with an aqueous solution of nickel nitrate and ammonium metatungstate, and dried in air at 100° C. The dried pellets were then calcined in air in a kiln in which the temperature was raised from ambient room temperature to 220° C. and held at that temperature for 1 hour, and then increased to 500° C. and held at the higher temperature for another hour. The catalyst composition had an overall chemical composition of (anhydrous basis):

| Component | Wt., % |
|---|---|
| $SiO_2$ | 52.42 |
| $Al_2O_3$ | 22.24 |
| NiO | 4.85 |
| $WO_3$ | 19.59 |
| $Na_2O$ | <0.02 |
| $(NH_4)_2O$ | <0.06 |
| $NO_3$ | <0.06 |

When tested as a catalyst for naptha hydrocracking, the first stage activity was 677° F. and the second stage activity was 497° F. This activity can be directly compared with that of a catalyst composition prepared from the same zeolite beta and alumina (50% beta, 50% alumina) and containing 4.1 wt. % NiO and 19.0 wt. % $WO_3$. The latter catalyst had a first stage activity of 662° F. and a second stage activity of 489° F.

The octane of the hydrocracked product using the catalyst of the present invention is significantly increased, at least in part, by the improved isomerization activity of the zeolite beta constituent. This improved isomerization activity is evident from the data obtained from the following experimental procedure.

(a) 51.74 grams (anhydrous weight) of sodium aluminate were added to 361.4 grams of 40% tetraethylammonium hydroxide (TEAOH) and mixed on a magnetic stirrer for a period of five minutes at room temperature before heating to reflux. The resulting slurry was transferred to a plastic beaker and stirred with a Heidolph mixer fitted with a jiffy paint mix stirrer until it cooled. As the slurry cooled, additional precipitate formed. When cool, 945.1 grams of Ludox LS silica sol were gradually added with stirring to the sodium aluminate/TEAOH slurry. A very thick gel formed and additional hand agitation was needed to keep the slurry mixing. After all the silica sol had been added, the gel was mixed for a period of five minutes during which it thinned slightly. 1295.5 grams of the gel were transferred to a two liter reactor and digested for a period of seven days at a temperature of 155° C. The reactor was then cooled overnight. Initial filtration was slow, but as the product was washed with deionized water, filtration became easier. After washing until the pH of the filtrate was less than 10, the solid product was dried at room temperature and fully characterized. The solid product exhibited the characteristic x-ray powder pattern of zeolite beta. The zeolite beta product was then calcined in flowing air at a temperature of 600° C. for a period of 2 hours to decompose the tetraethylammonium cation. After cooling, the calcined zeolite beta product was exchanged with $NH_4NO_3$ solution (5 grams $NH_4NO_3$ per gram of calcined zeolite beta product) at reflux (3 times), washed in distilled water and dried at room temperature. The chemical composition of the calcined, ammonium-exchanged zeolite beta product was as follows:

| | |
|---|---|
| $Na_2O$, wt. % | <0.03 |
| $(TEA)_2O$, wt. % | — |
| $(NH_4)_2O$, wt. % | 2.78 |
| $Al_2O_3$, wt. % | 6.03 |
| $SiO_2$, wt. % | 90.26 |
| $(TEA)_2O/Al_2O_3$ | — |
| $(NH_4)_2O/Al_2O_3$ | 0.90 |
| $(SiO_2/Al_2O_3)$ | 25.39 |

(b) 100 grams of calcined ammonium-exchanged zeolite beta product prepared as in part (a) above were slurried in a beaker in one liter of distilled water. A second solution containing 0.60 grams of $Pt(NH_3)_4Cl_2$ dissolved in 500 milliliters of distilled water was then added to the zeolite slurry and the zeolite beta was platinum-exchanged. The resulting slurry was then filtered and washed with distilled water, dried, extruded with peptized alumina binder and dried again for a period of sixteen hours. The extrudates contained 0.32 wt. % platinum. The extrudates were split into two batches, one batch was calcined in air at a maximum temperature of 650° C. (hereinafter Catalyst A) and the second batch was calcined in air at a maximum temperature of 540° C. (hereinafter Catalyst B).

Separate samples of Catalyst A and Catalyst B prepared in part (b) above were evaluated for $C_5/C_6$ isomerization activity using a fixed bed microreactor unit comprising a stainless steel tube (⅜-inch internal diameter). About 8.0 to 12.0 grams of selected Catalyst A or Catalyst B (40×60 mesh, U. S. Standard) were loaded in the microreactor and reduced under a flow of hydrogen gas at a temperature of greater than 200° C. for a period of sixteen hours. A feed consisting of 60 wt. % n-$C_4$, 35 wt. % n-$C_6$ and 5 wt. % cyclohexane was then introduced into the microreactor at a reaction pressure of 250 psig, a weight hourly space velocity (WHSV) of 1.6 hr.$^{-1}$, a hydrogen/hydrocarbon feed molar ratio of 2 and a reaction temperature specified in Table II below. Products were collected at selected run times and the products were analyzed by gas chromatography. The products were evaluated in several respects by determining $$i\text{-}C_5 \text{ Conversion} = \frac{i\text{-}C_5}{i\text{-}C_5 + n\text{-}C_5}$$

$$2,2\text{-DMB (Dimethylbutane) Conversion} = \frac{2,2\text{-DMB}}{\text{Total } C_6 \text{ Paraffins}}$$

as a means to determine the relative extent of conversion of pentane and hexane to isomeric products. The results are set forth in Table II below.

TABLE II

| Catalyst | Reaction Temperature (°C.) | i-$C_5$ Conversion | 2,2-DMB Conversion | $C_5^+$ Yield |
|---|---|---|---|---|
| A | 251.7 | 62.9 | 18.1 | 98.5 |
| A | 260.0 | 68.1 | 19.0 | 97.3 |
| A | 265.6 | 69.2 | 19.2 | 95.7 |
| A | 273.9 | 69.1 | 19.0 | 92.4 |
| B | 251.7 | 55.7 | 13.5 | 98.9 |
| B | 260.0 | 63.1 | 15.1 | 97.8 |
| B | 265.6 | 66.5 | 16.1 | 96.5 |
| B | 273.9 | 68.9 | 18.0 | 93.7 |

Based on the evidence obtained with zeolite Y-85 and the particular zeolite beta of this invention, it is expected that a similar improvement in the octane of a hydrocarbon product will be obtained using a mixture of this zeolite beta and other catalytic forms of zeolite Y. Mixtures of this beta with LZ-210, LZ-10 and other steam-stabilized forms of zeolite Y such as Y-82 are illustrative of such catalyst compositions when combined with hydrogenation agents as hereinabove described.

What is claimed is:

1. A catalyst composition suitable for use in the catalytic hydrocracking of hydrocarbon feedstocks to gasoline which comprises a modified form of zeolite Y prepared by the steps of:
   (a) ammonium ion-exchanging zeolite Y to lower its alkali metal content of less than 4.0 weight percent;
   (b) hydrothermal steaming the low-sodium product of step (a) at a temperature of 550° C. to about 850° C. to reduce the unit cell dimension; and
   (c) contacting the steamed product of step (b) with a sufficient amount of an aqueous solution of ammonium ions having a pH of less than about 4.0 for a sufficient time to exchange at least some of the residual alkali metal cations for ammonium ions and to increase the bulk $Si/Al_2$ molar ratio of the zeolite composition to the range of 6.5 to 20;
   an activated zeolite beta prepared by ion-exchanging the sodium and hydrogen form of zeolite beta in which the hydrogen cations are formed by the thermal decomposition of the organic templating cations, present in the as-synthesized form of zeolite beta, with a hydrogen-forming cation other than hydronium to reduce the sodium cation population to less than 25 equivalent percent, and calcining the thus-exchanged zeolite in air or an inert atmosphere at a temperature effective to form an initial concentration of weak acid species and strong acid species, and continuing said heating to substantially reduce the concentration of strong acid species without substantially reducing the concentration of weak acid species;
and a metal hydrogenation component.

2. Composition according to claim 1 wherein the activated zeolite beta constituent of the catalyst composition has a sodium cation population of less than 10 equivalent percent.

3. Composition according to claim 2 wherein the activated zeolite beta contains a concentration of hydronium cations corresponding to less than 0.2 milliequivalents of NaOH per gram of zeolite beta and a concentration of hydroxoaluminum cations corresponding to at least 0.8 milliequivalents of NaOH per gram of zeolite beta.

4. Composition according to claim 2 wherein the zeolite beta constituent is present in the catalyst in an amount of from 10 to 30 weight percent of the combined weight of zeolite beta and modified form of zeolite Y.

* * * * *